United States Patent
He (10) Patent No.: US 10,958,592 B2
(45) Date of Patent: Mar. 23, 2021

(54) DOMAIN NAME BANDWIDTH ADJUSTMENT METHOD AND APPARATUS

(71) Applicant: WANGSU SCIENCE & TECHNOLOGY CO., LTD., Shanghai (CN)

(72) Inventor: Jinlong He, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/872,558

(22) Filed: May 12, 2020

(65) Prior Publication Data

US 2020/0328986 A1 Oct. 15, 2020

Related U.S. Application Data

(63) Continuation of application No. PCT/CN2019/086059, filed on May 8, 2019.

(30) Foreign Application Priority Data

Apr. 12, 2019 (CN) .......................... 201910293699.8

(51) Int. Cl.
*H04L 12/911* (2013.01)
*H04L 12/917* (2013.01)
(Continued)

(52) U.S. Cl.
CPC ............ *H04L 47/826* (2013.01); *H04L 47/76* (2013.01); *H04L 61/1511* (2013.01); *H04L 67/327* (2013.01)

(58) Field of Classification Search
CPC combination set(s) only.
See application file for complete search history.

(56) References Cited

U.S. PATENT DOCUMENTS 7,010,598 B2 * 3/2006 Sitaraman ............... H04L 43/00 709/224
10,097,448 B1 * 10/2018 Howard ............. H04L 61/1511
(Continued)

FOREIGN PATENT DOCUMENTS

CN 1885821 A 12/2006
CN 104348753 A 2/2015
(Continued)

OTHER PUBLICATIONS

International Search Report for International Application No. PCT/CN2019/086059 dated Jan. 16, 2020.
(Continued)

*Primary Examiner* — El Hadji M Sall
(74) *Attorney, Agent, or Firm* — Heslin Rothenberg Farley & Mesiti P.C.

(57) ABSTRACT

Disclosed is a domain name bandwidth adjustment method and apparatus, wherein the method includes: determining whether a CDN system triggers a bandwidth speed limiting policy, if yes, determining a to-be-limited domain name from domain names served by the CDN system, and executing the bandwidth speed limiting policy on the target domain name; when the bandwidth speed limiting policy is being executed, determining an initial reference bandwidth of the target domain name, and comparing the initial reference bandwidth with an actual bandwidth of the target domain name within a specified observation duration, to determine whether to perform step adjustment on the initial reference bandwidth and determine whether to release the bandwidth speed limiting policy. In the technical solutions provided in the present disclosure, the bandwidth of the target domain name can be effectively controlled, and the bandwidth of the target domain name can be prevented from rising again.

20 Claims, 4 Drawing Sheets

(51) Int. Cl.
*H04L 29/08* (2006.01)
*H04L 29/12* (2006.01)

(56) References Cited

U.S. PATENT DOCUMENTS

2014/0269319 A1     9/2014   DeCusatis et al.
2017/0134253 A1*    5/2017   Wang .................. H04L 67/1097
2018/0309795 A1*   10/2018   Ithal ........................ H04L 63/10

FOREIGN PATENT DOCUMENTS

| CN | 106034083 A | 10/2016 |
| CN | 109067607 A | 12/2018 |
| CN | 109412977 A | 3/2019 |
| CN | 109547517 A | 3/2019 |

OTHER PUBLICATIONS

Office Action for Chinese Patent Application No. 201910293699.8 dated Apr. 22, 2020.

* cited by examiner

DOMAIN NAME BANDWIDTH ADJUSTMENT METHOD AND APPARATUS

CROSS-REFERENCE TO RELATED APPLICATIONS

This application is a continuation of PCT application No. PCT/CN2019/086059 filed on May 8, 2019, and claims priority to Chinese Patent Application No. 201910293699.8, filed on Apr. 12, 2019 and entitled "DOMAIN NAME BANDWIDTH ADJUSTMENT METHOD AND APPARATUS", each of which are incorporated herein by reference in their entireties.

TECHNICAL FIELD

The present disclosure relates to the field of Internet technologies, and in particular, to a domain name bandwidth adjustment method and apparatus.

BACKGROUND

With development of the Internet, a content delivery network (CDN) system is increasingly more widely deployed in a network to increase a speed at which people accesses a website. As data traffic, especially that for game and video websites, in the network surges, relatively large edge bandwidth and back-source bandwidth are usually generated in these websites during data update. A continuously risen edge bandwidth reduces a speed for a user to access other networks in the CDN system, and a continuously risen back-source bandwidth increases pressure of a source station in the CDN system, which is likely to cause instability of the entire CDN system.

In view of the foregoing problem, in an existing CDN system, a speed of the edge bandwidth or the back-source bandwidth is limited according to the Global Protection Control (GPC) system. However, in a speed limiting state, the CDN system is prone to make a misjudgment. To be specific, when the edge bandwidth or the back-source bandwidth is reduced, the CDN system directly releases a speed limit on the edge bandwidth or the back-source bandwidth, which is likely causing the edge bandwidth or the back-source bandwidth to rise again.

In view of this, it is necessary to provide a new domain name bandwidth adjustment method and apparatus to resolve the foregoing disadvantages.

SUMMARY

The present disclosure is intended to provide a domain name bandwidth adjustment method and apparatus, so as to prevent a speed of an edge bandwidth or a back-source bandwidth of a target domain name from rising again as a result of direct release of bandwidth limit.

To achieve the foregoing purpose, an aspect of the present disclosure provides a domain name bandwidth method applied to a CDN system, the method including: determining whether the CDN system triggers a bandwidth speed limiting policy, if yes, determining a to-be-limited target domain name from domain names served by the CDN system, and executing the bandwidth speed limiting policy on the target domain name; when the bandwidth speed limiting policy is being executed, determining an initial reference bandwidth of the target domain name, and comparing the initial reference bandwidth with an actual bandwidth of the target domain name within a specified observation duration, to determine whether to perform step adjustment on the initial reference bandwidth and determine whether to release the bandwidth speed limiting policy.

To achieve the foregoing purpose, another aspect of the present disclosure further provides a domain name bandwidth adjustment apparatus applied to a CDN system, the domain name bandwidth adjustment apparatus including: a speed limit determining unit, configured to: determine whether the CDN system triggers a bandwidth speed limiting policy, and determine whether to release the bandwidth speed limiting policy; a domain identification unit, configured to determine a to-be-limited target domain name from domain names served by the CDN system after the bandwidth speed limiting policy is triggered; and a bandwidth adjustment unit, configured to: determine an initial reference bandwidth of the target domain name, and compare the initial reference bandwidth with an actual bandwidth of the target domain name within a specified observation duration, to determine whether to perform step adjustment on the initial reference bandwidth.

It can be learned that, according to the technical solutions provided in the present disclosure, the CDN system can automatically determine, according to a load state of an edge node server or a relay node server, whether to trigger the bandwidth speed limiting policy, and automatically determines, when determining to trigger the bandwidth speed limiting policy, a target domain name that needs to be limited from domain names served by the edge node server or relay node server, and then limit an edge bandwidth or a back-source bandwidth of the target domain name according to the specified initial reference bandwidth. If a duration of time—in which the actual bandwidth of the target domain name is less than or equal to the initial reference bandwidth—reaches a preset reference duration, the CDN system performs step adjustment on the initial reference bandwidth of the target domain name, and gradually increases an available bandwidth of the target domain name in the entire CDN system according to an adjusted reference bandwidth, to improve user experience in accessing the target domain name. When the duration of time—in which the actual bandwidth of the target domain name is less than or equal to the initial reference bandwidth—reaches the specified observation duration, the CDN system releases the bandwidth speed limiting policy to completely releases the bandwidth limit on the target domain name. It can be learned that, according to the technical solutions provided in the present disclosure, the CDN system can gradually recover acceleration on the target domain name by performing bandwidth step adjustment and speed limiting observation on the target domain name, not only improving the user experience in accessing the target domain name, but also preventing the edge bandwidth or the back-source bandwidth of the target domain name from rising again as a result of direct release of the bandwidth limit.

BRIEF DESCRIPTION OF THE DRAWINGS

To illustrate the technical solutions according to the embodiments of this application more clearly, the accompanying drawings required for describing the embodiments are introduced below briefly. Apparently, the accompanying drawings in the following descriptions merely show some of the embodiments of this disclosure, and persons of ordinary skill in the art can obtain other drawings according to the accompanying drawings without creative efforts.

DETAILED DESCRIPTION

To make the objectives, technical solutions, and advantages of this application more comprehensible, the following further describes the embodiments of this application in detail with reference to the accompanying drawings.

A node is a basic deployment unit in a CDN system, each node consists of a cluster of cache servers. The CDN system design is mainly designed to minimize an access response time for a user. To achieve this goal, in the CDN system, required content of the user is stored at a location as close as possible to the user. In other words, a cache server responsible for providing a content service to the user should be deployed in a physical network edge location. The network edge location may be referred to as an edge node, and the cache server deployed at the edge node may be referred to as an edge node server. In addition, devices responsible for global management and control in the CDN system constitute a central node. The central node can not only monitor each subsystem and device in the entire CDN network in real time, and generate a corresponding alarm for various faults, but also detect total traffic in the system and traffic of each edge node in real time. In the present disclosure, a cache server deployed at the central node is referred to as a relay node server. A most complete content copy is stored in the relay node server. When the edge node server does not cache content to be accessed by a user, the edge node server sends a request to the relay node server. If the relay node server also does not cache the content to be accessed by the user, the relay node server is required to back to a source station. If the relay node server fails or is poor in a service capability, the edge node server is required to directly back to the source station. In the present disclosure, a network bandwidth generated from a data exchange between the user and the edge node server is referred to as an edge bandwidth, and a network bandwidth generated from a data exchange between the relay node server and the source station is referred to as a back-source bandwidth.

Referring to FIG. 1 to FIG. 4 together, a domain name bandwidth adjustment method provided in the present disclosure may include the following steps.

Figure 1:
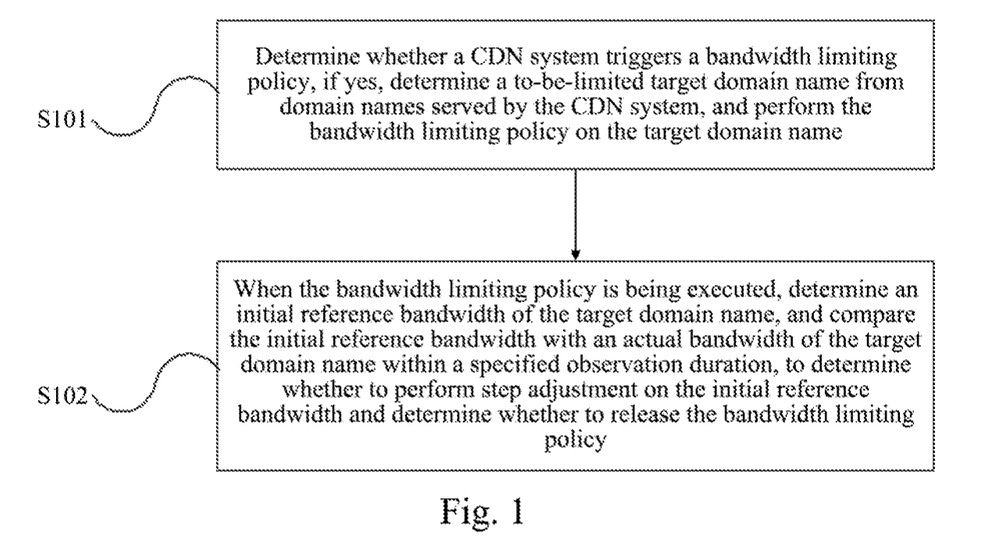
FIG. 1 is a flowchart of a domain name bandwidth adjustment method according to an embodiment of the present disclosure.

S101: It is determined whether a CDN system triggers a bandwidth speed limiting policy, if yes, a to-be-limited target domain name from domain names served by the CDN system is determined, and the bandwidth speed limiting policy is performed on the target domain name.

In this embodiment, the CDN system determine, according to a load state of a cache server and a load state of an entire network bandwidth, whether to trigger the bandwidth speed limiting policy. If load of the cache server or the network bandwidth is excessively heavy, operation of the entire CDN system is unstable, affecting providing of external services by the CDN system. Therefore, the CDN system triggers the bandwidth speed limiting policy to limit the network bandwidth and reduce loads of the cache server and the network bandwidth. Because the CDN system provides acceleration services for a plurality of domain names simultaneously, when triggering the bandwidth speed limiting policy, the CDN system identifies, from all the domain names that are served, a domain name whose bandwidth rises, that is, determines the to-be-limited target domain name, and performs the bandwidth speed limiting policy on the target domain name to limit an access bandwidth of the target domain name.

In an embodiment, for the edge node server in the CDN system, when a user accesses the target domain name, content requested by the user has been cached in the edge node server serving the target domain name, and the edge node server directly returns the requested content to the user. If the user requests for a large amount of content, for example, the user needs to update a game version, download a video, etc., a relatively large edge bandwidth is generated, and the edge node server is also subject to a relatively large access pressure. In this case, the CDN system enables, according to a preset redundant resource using policy, a network bandwidth reserved in the edge node and a computing capability reserved in the edge node server, so as to improve a service capability of the edge node. The CDN system also calculates a performance indicator of the edge node server. The performance indicator includes but is not limited to a delay speed, a lag frequency, a download speed, a start speed, a back-source frequency, and the like. When the performance indicator is lower than a preset indicator threshold, the CDN system determines that the reserved network bandwidth and computing capability cannot meet the user's access requirement, and the CDN system triggers the bandwidth speed limiting policy on the target domain name.

In another embodiment, for the relay node server in the CDN system, when a user accesses the target domain name, content requested by the user is cached neither in the edge node server serving the target domain name nor in the relay node server serving the edge node server, then the relay node server may send an access request to the source station. If the user requests for a large amount of content, for example, the user needs to update a game version, download a video, etc., a relatively large back-source bandwidth is generated, and the relay node server and the source station are also subject to a relatively large pressure. In this case, the CDN system calls more network bandwidths and servers from a resource pool or a spare pool according to a preset DNS scheduling policy, so as to improve a service capability of the relay node. In the CDN system, the relay node server is at a central position of the entire network, and converges a back-source request of each edge node server. If the CDN system directly limits performance of the relay node server when load of the relay node server is excessively heavy, the performance of the entire CDN system is reduced, and an acceleration service of the system is seriously affected. Therefore, when the load of the relay node server is excessively heavy, the CDN system does not adjust a working status of the relay node server. The CDN system adjusts the working status of the relay node server only after alarm information is sent when the load of the relay node server reaches a specific threshold. After the CDN system determines that the relay node server generates the alarm information, the CDN system triggers the bandwidth speed limiting policy on the target domain name.

In this embodiment, an alarm cancellation policy may be further preset in the CDN system. After determining that the relay node server generates the alarm information, the CDN system automatically reduces the load of the relay node server to a security level, and triggers the bandwidth speed limiting policy on the target domain name after the relay node server cancels the alarm information, to further improve stability of the CDN system.

In this embodiment, after the relay node server sends the alarm information, processing may also be performed through manual intervention. For example, an operator may directly reduce the back-source bandwidth of the target domain name on the relay node server, or directly reduces back-source bandwidths of all the domain names served by the relay node server service, and the operator may further determine whether the alarm information is false. If the alarm information is false, the operator may directly cancel the bandwidth speed limiting policy on the target domain name.

S102: When the bandwidth speed limiting policy is being executed, an initial reference bandwidth of the target domain name is determined, and the initial reference bandwidth is compared with an actual bandwidth of the target domain name within a specified observation duration, to determine whether to perform step adjustment on the initial reference bandwidth and determine whether to release the bandwidth speed limiting policy.

In this embodiment, because the CDN system can monitor traffic of the target domain name in the entire system and in each edge node in real time, when the bandwidth speed limiting policy is being triggered, the actual bandwidth value of the target domain name in the entire CDN system may be set as the initial reference bandwidth, and the initial reference bandwidth is set as the available bandwidth of the target domain name in the entire CDN system, so as to prevent service quality of the CDN system for other domain names from being affected as a result of infinite rising of the network bandwidth of the target domain name. It should be particularly noted that the initial reference bandwidth may be set to be less than an actual bandwidth value of the target domain name in the entire CDN system when the bandwidth speed limiting policy is triggered, which is not limited in the present disclosure.

After the initial reference bandwidth is set, the CDN system compares an actual bandwidth of the target domain name in the entire CDN system with the initial reference bandwidth in real time within a specified observation duration, determines, according to a preset condition, whether to perform step adjustment on the initial reference bandwidth of the target domain name, and determines whether to release the bandwidth speed limiting policy on the target domain name. It should be particularly noted that the specified observation duration may be set according to an empirical value, for example, set to 30 minutes. A starting point of the specified observation duration may be set to a time point at which the CDN system triggers the bandwidth speed limiting policy, or may be set to any time point after the CDN system triggers the bandwidth speed limiting policy, which is not limited in the present disclosure.

For convenience of description, the initial reference bandwidth is denoted as C0 below.

Figure 2:
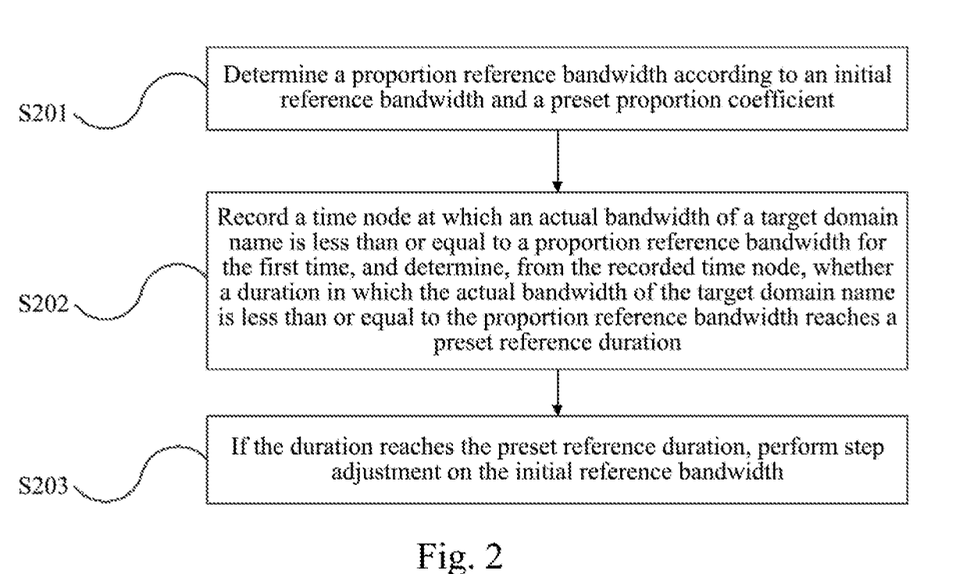
FIG. 2 is a flowchart of determining whether to perform step adjustment on an initial reference bandwidth according to an embodiment of the present disclosure.

In this embodiment, that the CDN system determines whether to perform step adjustment on the initial reference bandwidth includes the following steps.

S201: A proportion reference bandwidth is determined according to the initial reference bandwidth and a preset proportion coefficient.

The preset proportion coefficient may be set using an empirical value. For example, the preset proportion coefficient is set to 0.8, and correspondingly, the proportion reference bandwidth is set to 0.8C0. Setting of the preset proportion coefficient is not limited in the present disclosure.

S202: A time node at which the actual bandwidth of the target domain name is less than or equal to the proportion reference bandwidth for the first time is recorded, and it is determined, from the recorded time node, whether a duration of time—in which the actual bandwidth of the target domain name is less than or equal to the proportion reference bandwidth—reaches a preset reference duration.

The CDN system records the actual bandwidth of the target domain name in the entire CDN system in real time, and compares the actual bandwidth with the proportion reference bandwidth in real time. When the actual bandwidth is less than or equal to the proportion reference bandwidth for the first time, the CDN system records the current time point, and determines, from the time point, whether the duration of time—in which the actual bandwidth of the target domain name is less than or equal to the proportion reference bandwidth—reaches the preset reference duration.

It should be particularly noted that the preset reference duration may be set according to an empirical value. For example, the preset reference duration is set to 5 minutes. A specific value of the preset reference duration is not limited in the present disclosure, but the preset reference duration needs to be less than the specified observation duration.

S203: If the duration of time reaches the preset reference duration, step adjustment is performed on the initial reference bandwidth.

If the duration of time—in which the actual bandwidth of the target domain name is less than or equal to the proportion reference bandwidth—reaches the preset reference duration, the CDN system performs step adjustment on the initial reference bandwidth of the target domain name.

If the duration of time—in which the actual bandwidth of the target domain name is less than or equal to the proportion reference bandwidth—is less than the preset reference duration, the CDN system re-records, from a moment at which the actual bandwidth of the target domain name is greater than the proportion reference bandwidth, a time node at which the actual bandwidth of the target domain name is less than or equal to the proportion reference bandwidth for the first time, and determines, from the re-recorded time node, whether a duration of time—in which the actual bandwidth of the target domain name is less than or equal to the proportion reference bandwidth—reaches the preset reference duration.

How the CDN system determines whether to perform step adjustment on the initial reference bandwidth of the target domain name is exemplified below.

Assuming that the time node at which the actual bandwidth of the target domain name is less than or equal to the proportion reference bandwidth (it is assumed that the proportion reference bandwidth is 0.8C0) for the first time is 11:02, the preset reference duration is 5 minutes, the CDN system determines, using 11:02 as a time node, whether the actual bandwidth of the target domain name is always less than or equal to 0.8C0 within a duration from 11:02 to 11:07.

If the actual bandwidth of the target domain name is always less than or equal to 0.8C0 within the duration from 11:02 to 11:07, the CDN system determines that the duration of time—in which the actual bandwidth of the target domain name is less than or equal to $0.8C0$—reaches the preset reference duration, and the CDN system performs step adjustment on the initial reference bandwidth (that is, C0) of the target domain name.

If the actual bandwidth of the target domain name bursts within the duration from 11:02 to 11:07, for example, if the actual bandwidth of the target domain name bursts at 11:04 to be greater than $0.8C0$, the CDN system determines that the duration of time—in which the actual bandwidth of the target domain name is less than or equal to $0.8C0$—is less than the preset reference duration. In this case, the CDN system maintains the initial reference bandwidth of the target domain name unchanged, continues limiting a speed of the target domain name, and compares, using 11:04 as a time reset point, an actual bandwidth of the target domain name after 11:04 with $0.8C0$ again. Assuming that the actual bandwidth is less than or equal to $0.8C0$ again at 11:12, the CDN system uses 11:12 as a new time node, and determines whether the actual bandwidth of the target domain name is always less than or equal to $0.8C0$ within a duration from 11:12 to 11:17. If the actual bandwidth of the CDN target domain name is always less than or equal to $0.8C0$ within the duration from 11:12 to 11:17, the CDN system determines that the duration of time—in which the actual bandwidth of the target domain name is less than or equal to $0.8C0$—reaches the preset reference duration, and performs step adjustment on the initial reference bandwidth of the target domain name. If the actual bandwidth of the target domain name bursts again within the duration from 11:12 to 11:17 to be greater than $0.8C0$, the CDN system determines that the duration of time—in which the actual bandwidth of the target domain name is less than or equal to $0.8C0$—is less than the preset reference duration. The CDN system maintains the initial reference bandwidth of the target domain name unchanged, continues limiting the speed of the target domain name, and repeats the foregoing determining process using a moment at which the actual bandwidth bursts again as a time reset point.

Figure 3:
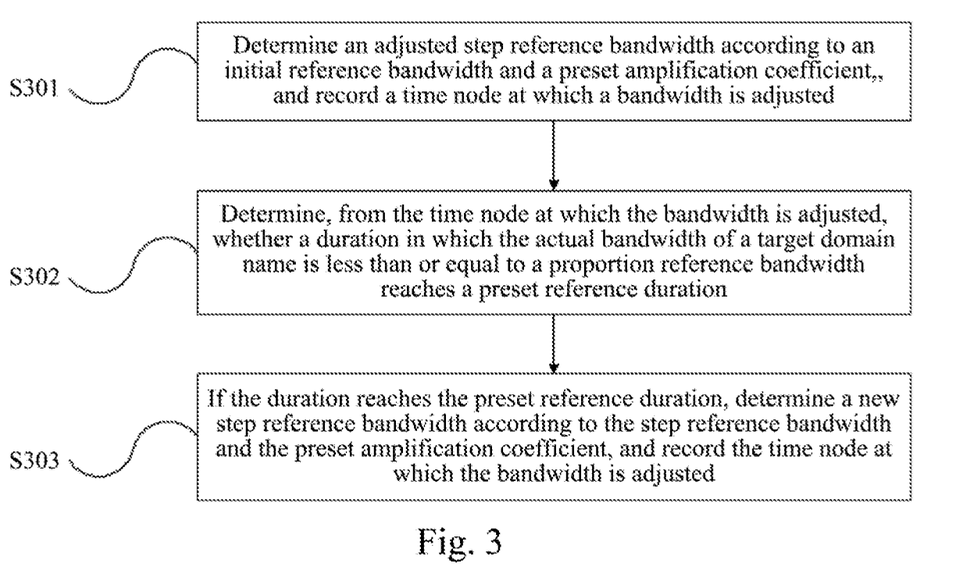
FIG. 3 is a flowchart of performing step adjustment on an initial reference bandwidth according to an embodiment of the present disclosure.

In this embodiment, when the duration of time—in which the actual bandwidth of the target domain name is less than or equal to $0.8C0$—reaches the preset reference duration, the CDN system performs step adjustment on the initial reference bandwidth of the target domain name. Performing step adjustment on the initial reference bandwidth includes the following steps.

S301: According to the initial reference bandwidth and a preset growth coefficient, an adjusted step reference bandwidth is determined, and a time node at which the bandwidth is adjusted is recorded.

In this embodiment, the preset growth coefficient may be set using an empirical value. For example, the preset growth coefficient is set to 1.1, and correspondingly, the step reference bandwidth is $1.1C0$ after a first adjustment is performed on the initial reference bandwidth, and the CDN system also records a time node at which the initial reference bandwidth is adjusted for the first time. It should be particularly noted that each time the CDN system determines a new step reference bandwidth, the CDN system synchronously records a time node at which the bandwidth is adjusted.

Apparently, setting the preset growth coefficient to 1.1 leads an adjusted step reference bandwidth of the target domain name to be greater than the initial reference bandwidth, which is equivalent to that the CDN system increases an available bandwidth of the target domain name in the entire CDN system, so that a user can access the target domain name faster and gain better access experience.

S302: It is determined, from the time node at which the bandwidth adjusted, whether the duration of time—in which the actual bandwidth of the target domain name is less than or equal to the proportion reference bandwidth—reaches the preset reference duration.

In this embodiment, the CDN system records the actual bandwidth of the target domain name in real time, compares, from the recorded time node at which the bandwidth is adjusted, an actual bandwidth of the target domain name with the proportion reference bandwidth in real time, and determines whether the duration of time—in which the actual bandwidth of the target domain name is less than or equal to the proportion reference bandwidth—reaches the preset reference duration.

S303: If the duration of time reaches the preset reference duration, a new step reference bandwidth is determined according to the step reference bandwidth and the preset growth coefficient, and the time node at which the bandwidth is adjusted is recorded.

If the duration of time—in which the actual bandwidth of the target domain name is less than or equal to the proportion reference bandwidth—reaches the preset reference duration, the CDN system adjusts the initial reference bandwidth of the target domain name again according to the step reference bandwidth and the preset growth coefficient, that is, determines a new step reference bandwidth of the target domain name, and the CDN system also records a time node at which the initial reference bandwidth of the target domain name is adjusted again. It should be particularly noted that each time the CDN system determines a new step reference bandwidth, the CDN system synchronously records a time node at which the bandwidth is adjusted.

If the duration of time—in which the actual bandwidth of the target domain name is less than or equal to the proportion reference bandwidth—is less than the preset reference duration, the CDN system re-records, from a moment at which the actual bandwidth of the target domain name is greater than the proportion reference bandwidth, a time node at which the actual bandwidth of the target domain name is less than or equal to the proportion reference bandwidth for the first time, and determines, from the re-recorded time node, whether a duration of time—in which the actual bandwidth of the target domain name is less than or equal to the proportion reference bandwidth—reaches the preset reference duration.

How the CDN system performs step adjustment on the initial reference bandwidth of the target domain name is exemplified below.

It is assumed that the preset proportion coefficient is set to 0.8, the preset growth coefficient is set to 1.1, and the preset reference duration is 5 minutes. Assuming that the time node at which the actual bandwidth of the target domain name is less than or equal to the proportion reference bandwidth (that is, $0.8C0$) for the first time is 15:00; and within a duration from 15:00 to 15:05, the actual bandwidth of the target domain name is always less than or equal to $0.8C0$, the CDN system determines that the duration of time—in which the actual bandwidth of the target domain name is less than or equal to $0.8C0$—reaches the preset reference duration, and the CDN system performs step adjustment on the initial reference bandwidth (that is, C0) of the target domain name, and adjusts the step reference bandwidth to $1.1C0$ after the first adjustment, and also records a time node (that is, 15:05) at which the initial reference bandwidth is adjusted for the first time.

The CDN system compares, using 15:05 as a starting point, an actual bandwidth of the target domain name after 15:05 with 0.8C0 in real time, and determines whether the actual bandwidth of the target domain name is always less than or equal to 0.8C0 within a duration from 15:05 to 15:10.

If the actual bandwidth of the target domain name is always less than or equal to 0.8C0 within the duration from 15:05 to 15:10, the CDN system determines that the duration of time—in which the actual bandwidth of the target domain name is less than or equal to 0.8C0—reaches the preset reference duration. The CDN system performs a second adjustment on the initial reference bandwidth of the target domain name on a basis of the step reference bandwidth (that is, 1.1C0) adjusted for the first time and according to the preset growth coefficient, and adjusts the step reference bandwidth to 11.1*1.C0 (that is, 1.21C0) after the second adjustment, that is, determines a new step reference bandwidth, and the CDN system also records a time node (that is, 15:10) at which the bandwidth is adjusted for the second time.

Apparently, the step reference bandwidth after the second adjustment is greater than the step reference bandwidth after the first adjustment. The CDN system further increases an available bandwidth of the target domain name in the entire CDN system, thereby further improving user experience of accessing the target domain name.

If the actual bandwidth of the target domain name bursts within the duration from 15:05 to 15:10, for example, if the actual bandwidth of the target domain name bursts at 15:06 to be greater than 0.8C0, the CDN system determines the duration of time—in which the actual bandwidth of the target domain name is less than or equal to 0.8C0—is less than the preset reference duration. In this case, the CDN system maintains the step reference bandwidth (that is, 1.1C0) adjusted for the first time unchanged, continues limiting a speed of the target domain name, and compares, using 15:06 as a time reset point, an actual bandwidth of the target domain name after 15:06 with 0.8C0 again in real time. Assuming that the actual bandwidth is less than or equal to 0.8C0 again at 15:22, the CDN system determines, using 15:22 as a new time node, whether the actual bandwidth of the target domain name is always less than or equal to 0.8C0 within a duration from 15:22 to 15:27. If the actual bandwidth of the CDN target domain name is always less than or equal to 0.8C0 within the duration from 15:22 to 15:27, the CDN system determines that the duration of time—in which the actual bandwidth of the target domain name is less than or equal to 0.8C0—reaches the preset reference duration, and the CDN system performs a second adjustment on the initial reference bandwidth of the target domain name. If the actual bandwidth of the target domain name bursts again within the duration from 15:22 to 15:27 to be greater than 0.8C0, the CDN system determines that the duration of time—in which the actual bandwidth of the target domain name is less than or equal to 0.8C0—is less than the preset reference duration. In this case, the CDN system maintains the step reference bandwidth adjusted for the first time (that is, 1.1C0) unchanged, continues limiting a speed of the target domain name, and repeats the foregoing determining process using a moment at which the actual bandwidth bursts again as a time reset point.

It should be particularly noted that if the actual burst bandwidth of the target domain name is greater than C0 in the foregoing determining process, in consideration of system stability, the adjusted step reference bandwidth may be reset to the initial reference bandwidth (that is, C0), and step adjustment is performed on the target domain name again on a basis of C0. After determining a new step reference bandwidth and recording a time node at which the bandwidth is adjusted, the CDN system repeats step S302, to further increase an available bandwidth of the target domain name in the entire CDN system, thereby gradually improving user experience of accessing the target domain name.

Figure 4:
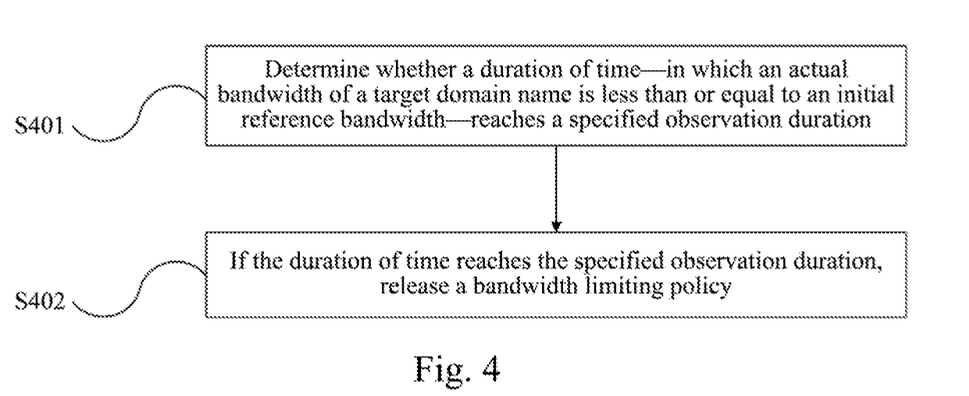
FIG. 4 is a flowchart of determining whether to release a bandwidth speed limiting policy according to an embodiment of the present disclosure.

In this embodiment, after the CDN system performs step adjustment on the initial reference bandwidth of the target domain name, a step of determining whether to release the bandwidth speed limiting policy is further included. In particular, the following steps are included.

S401: It is determined whether a duration of time—in which the actual bandwidth of the target domain name is less than or equal to the initial reference bandwidth—reaches the specified observation duration.

After the CDN system triggers the bandwidth speed limiting policy, the CDN system determines, using a time point at which the bandwidth speed limiting policy is triggered as a starting point and according to the specified observation duration, whether the actual bandwidth of the target domain name is always less than or equal to the initial reference bandwidth within the duration.

S402: If the duration of time reaches the specified observation duration, the bandwidth speed limiting policy is released.

If the actual bandwidth of the target domain name is always less than or equal to the initial reference bandwidth within the specified observation duration, the CDN system determines that the duration of time—in which the actual bandwidth of the target domain name is less than or equal to the initial reference bandwidth—reaches the specified observation duration. User's access requirements on the target domain name reduce, and the bandwidth of the target domain name no longer rises again. Therefore, the CDN system releases the bandwidth speed limiting policy on the target domain name.

If the duration of time is less than the specified observation duration, the CDN system resets, to the initial reference bandwidth, the reference bandwidth after step adjustment is performed, and compares the initial reference bandwidth with an actual bandwidth of the target domain name within the specified observation duration, to determine whether to perform step adjustment on the initial reference bandwidth and determine whether to release the bandwidth speed limiting policy.

How the CDN system determines whether to release the bandwidth speed limiting policy on the target domain name is exemplified below.

Assuming that the specified observation duration is 30 minutes, and the time point at which the CDN system triggers the bandwidth speed limiting policy is 12:08, the CDN system compares an actual bandwidth of the target domain name within a duration from 12:08 to 12:38 with the initial reference bandwidth (that is C0).

If the actual bandwidth of the target domain name is always less than or equal to C0 within the duration from 12:08 to 12:38, the CDN system determines that the duration of time—in which the actual bandwidth of the target domain name is less than or equal to C0—reaches the specified observation duration. User's access requirements on the target domain name reduce, and the bandwidth of the target domain name no longer rises again. Therefore, the CDN system releases the bandwidth speed limiting policy on the target domain name.

If the actual bandwidth of the target domain name bursts within the duration from 12:08 to 12:38, for example, if the actual bandwidth of the target domain name bursts at 12:30 to be greater than C0, the CDN system determines that the duration of time—in which the actual bandwidth of the target domain name is less than or equal to C0—is less than the specified observation duration. User's access requirements on the target domain name are still relatively large, and the bandwidth of the target domain name may rise again. In this case, the CDN system continues performing the bandwidth speed limiting policy on the target domain name, resets the adjusted step reference bandwidth of the target domain name to the initial reference bandwidth (that is, C0), and compares, using the moment (that is, 12:30) at which the actual bandwidth bursts as the time reset point, an actual bandwidth of the target domain name within the duration from 12:30 to 13:00 with the initial reference bandwidth (that is, C0), to determine whether to perform step adjustment on the initial reference bandwidth of the target domain name, and determine whether to release the bandwidth speed limiting policy on the target domain name.

In this embodiment, for a target cache server serving the target domain name in the CDN system, the bandwidth speed limiting policy further includes a step of determining a bandwidth limit value of the target domain name on each target cache server, and sending the bandwidth limit value to a corresponding target cache server.

In the CDN system, a plurality of edge node servers or relay node servers usually provides acceleration services for the target domain name. In the present disclosure, an edge node server or a relay node server that provides an acceleration service for the target domain name is referred to as a target cache server. Apparently, an available bandwidth of the target domain name in the entire CDN system is reflected by an available bandwidth of the target cache server in the entire CDN system. When the available bandwidth of the target cache server in the entire CDN system is increased, the available bandwidth of the target domain name in the whole CDN system is increased. The CDN system collects statistics about all the target cache servers, calculates an initial bandwidth limit value of the target domain name on each target cache server according to the preset bandwidth limit total value and a bandwidth proportion corresponding to a current target cache server, and sends the initial bandwidth limit value to the corresponding target cache server. After the CDN system performs step adjustment on the initial reference bandwidth of the target domain name, the CDN system re-adjusts the bandwidth limit total value of the target domain name according to the adjusted step reference bandwidth, and determines a step bandwidth limit value of the target domain name on each target cache server according to the bandwidth proportion. The CDN system gradually increases the available bandwidth of the target cache server in the entire CDN system using the step bandwidth limit value, to improve user experience of accessing the target domain name.

In this embodiment, when triggering the bandwidth speed limiting policy on the target domain name, the CDN system may collect statistics about an actual bandwidth of the target domain name on each target cache server, and calculates a ratio of the actual bandwidths of the target cache servers, to determine a bandwidth proportion corresponding to a current target cache server.

In this embodiment, the CDN system may set the preset bandwidth limit total value according to the initial reference bandwidth. A specific value of the preset bandwidth limit total value may be set according to an empirical value, but the preset bandwidth limit total value needs to be less than or equal to the initial reference bandwidth.

In this embodiment, for a relay node server in the CDN system, the CDN system may further set the preset bandwidth limit total value according to a performance indicator of a source station. For example, a maximum back-source bandwidth that the source station can bear is 10 M, and the CDN system may set the preset bandwidth limit total value to 10 M. Because one relay node server may provide acceleration services for a plurality of domain names at the same time, in some cases, the maximum back-source bandwidth that the source station can bear may be greater than the initial reference bandwidth set by the CDN system. In this case, the preset bandwidth limit total value should be set using the initial reference bandwidth as a reference standard.

It should be noted that, an adjustment coefficient of the bandwidth limit total value may be set with reference to the preset growth coefficient, or may be set according to an empirical value, which is not limited in the present disclosure.

For example, only two edge node servers: a target cache server A and a target cache server B in the entire CDN network provide acceleration services for the target domain name. Assuming that when the CDN system triggers the bandwidth speed limiting policy on the target domain name, an actual bandwidth of the target domain name on the target cache server A is 20 M, an actual bandwidth of the target domain name on the target cache server B is 30 M, and the initial reference bandwidth is set to 50 M, a bandwidth proportion corresponding to the target cache server A is 2/5, and a bandwidth proportion corresponding to the target cache server B is 3/5. If the preset bandwidth limit total value is set to 40 M, an initial bandwidth limit value of the target domain name on the target cache server A is 16 M, and an initial bandwidth limit value of the target domain name on the target cache server B is 24 M. The adjustment coefficient of the bandwidth limit total value is the preset growth coefficient. When the CDN system performs step adjustment on the initial reference bandwidth, the reference bandwidth adjusted for the first time is 55 M. In this case, the bandwidth limit total value of the target domain name is adjusted to 44 M correspondingly, a step bandwidth limit value of the target domain name on the target cache server A is adjusted to 17.6 M, and a step bandwidth limit value of the target domain name on the target cache server B is adjusted to 26.4 M.

The target cache server provides an acceleration service for the target domain name through a software process, and a plurality of acceleration processes in each target cache server simultaneously provide services for the target domain name. In order to further improve working efficiency of the target cache server, for the plurality of processes in the target cache server, the CDN system may further calculate a bandwidth limit value of each process in the target cache server according to the bandwidth limit value of the target cache server and a bandwidth proportion corresponding to a current process. After the bandwidth limit value of the target cache server is adjusted, the bandwidth limit value of each process is adjusted correspondingly.

Figure 5:
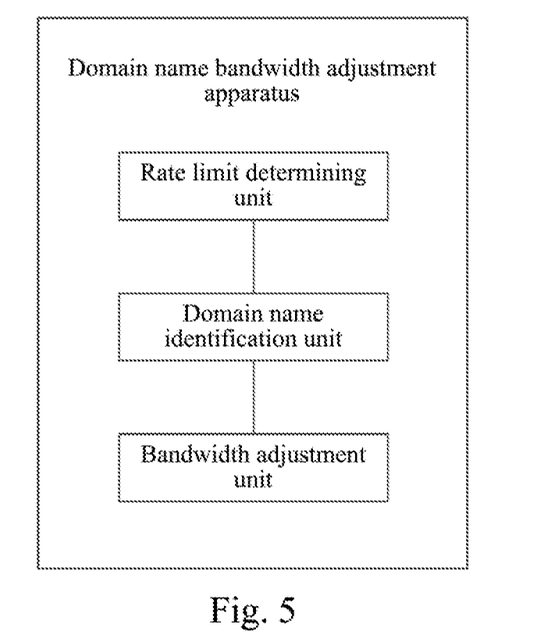
FIG. 5 is a schematic diagram of a functional module of a domain name bandwidth adjustment apparatus according to an embodiment of the present disclosure.

Referring to FIG. 5, the present disclosure further provides a domain name bandwidth adjustment apparatus applied to a CDN system, the domain name bandwidth adjustment apparatus including:

a speed limit determining unit, configured to: determine whether the CDN system triggers a bandwidth speed limiting policy, and determine whether to release a bandwidth speed limiting policy;

a domain name identification unit, configured to determine a to-be-limited target domain name from domain names served by the CDN system after the bandwidth speed limiting policy is triggered; and a bandwidth adjustment unit, configured to: determine an initial reference bandwidth of the target domain name, and compare the initial reference bandwidth with an actual bandwidth of the target domain name within a specified observation duration, to determine whether to perform step adjustment on the initial reference bandwidth.

In an embodiment, for an edge node server in the CDN system, the speed limit determining unit further includes:

a performance indicator calculation module, configured to calculate a performance indicator of the edge node server, when the performance indicator is lower than a preset indicator threshold, the bandwidth speed limiting policy being triggered.

In an embodiment, for a relay node server in the CDN system, the speed limit determining unit further includes:

an alarm information determining module, configured to determine whether the relay node server generates alarm information, if yes, the bandwidth speed limiting policy being triggered.

In an embodiment, that the bandwidth adjustment unit determines whether to perform step adjustment on the initial reference bandwidth includes:

determining a proportion reference bandwidth according to the initial reference bandwidth and a preset proportion coefficient;

recording a time node at which an actual bandwidth of the target domain name is less than or equal to the proportion reference bandwidth for the first time, and determining, from the recorded time node, whether a duration of time—in which the actual bandwidth of the target domain name is less than or equal to the proportion reference bandwidth—reaches a preset reference duration; and if the duration of time reaches the preset reference duration, performing step adjustment on the initial reference bandwidth; or if the duration of time is less than the preset reference duration, re-recording, from a moment at which the actual bandwidth of the target domain name is greater than the proportion reference bandwidth, a time node at which the actual bandwidth of the target domain name is less than or equal to the proportion reference bandwidth for the first time, and determining, from the re-recorded time node, whether a duration of time—in which the actual bandwidth of the target domain name is less than or equal to the proportion reference bandwidth—reaches the preset reference duration.

In an embodiment, that the speed limit determining unit determines whether to release the bandwidth speed limiting policy includes:

determining whether a duration of time—in which the actual bandwidth of the target domain name is less than or equal to the initial reference bandwidth—reaches the specified observation duration; and if the duration of time reaches the specified observation duration, releasing the bandwidth speed limiting policy; or if the duration of time is less than the specified observation duration, resetting the reference bandwidth after step adjustment is performed to the initial reference bandwidth, and, comparing the initial reference bandwidth with the actual bandwidth of the target domain name again within the specified observation duration, to determine whether to perform step adjustment on the initial reference bandwidth and determine whether to release the bandwidth speed limiting policy.

In an embodiment, the bandwidth adjustment unit includes:

a step bandwidth calculation module, configured to: determine an adjusted step reference bandwidth according to the initial reference bandwidth and a preset growth coefficient, determine a new step reference bandwidth according to the step reference bandwidth and the preset growth coefficient, and synchronously record a time node at which the bandwidth is adjusted; and a step adjustment determining module, configured to determine, from the time node at which the bandwidth is adjusted, whether a duration of time—in which the actual bandwidth of the target domain name is less than or equal to the proportion reference bandwidth—reaches the preset reference duration.

In this embodiment, if the step adjustment determining module determines, from the time node at which the bandwidth is adjusted, that the duration of time—in which the actual bandwidth of the target domain name is less than or equal to the proportion reference bandwidth—reaches the preset reference duration, the step bandwidth calculation module determines a new step reference bandwidth according to the step reference bandwidth and the preset growth coefficient, and records the time node at which the bandwidth is adjusted.

In this embodiment, if the step adjustment determining module determines, from the time node at which the bandwidth is adjusted, that the duration of time—in which the actual bandwidth of the target domain name is less than or equal to the proportion reference bandwidth—is less than the preset reference duration, the bandwidth adjustment unit re-records, from a moment at which the actual bandwidth of the target domain name is greater than the proportion reference bandwidth, a time node at which the actual bandwidth of the target domain name is less than or equal to the proportion reference bandwidth for the first time, and determines, from the re-recorded time node, whether a duration of time—in which the actual bandwidth of the target domain name is less than or equal to the proportion reference bandwidth—reaches the preset reference duration.

In an embodiment, for a target cache server serving the target domain name in the CDN system, the domain name bandwidth adjustment apparatus further includes:

a target cache server control unit, configured to: determine a bandwidth limit value of the target domain name on each target cache server, and send the bandwidth limit value to a corresponding target cache server.

In an embodiment, the target cache server control unit includes:

an initial bandwidth limit value calculation module, configured to: determine an initial bandwidth limit value of the target domain name on a current target cache server according to a preset bandwidth limit total value and a bandwidth proportion corresponding to the current target cache server; and a step bandwidth limit value calculation module, configured to: after step adjustment is performed on the initial reference bandwidth, determine a step bandwidth limit value of the target domain name on the current target cache server according to an adjusted reference bandwidth and the bandwidth proportion corresponding to the current target cache server.

Figure 6:
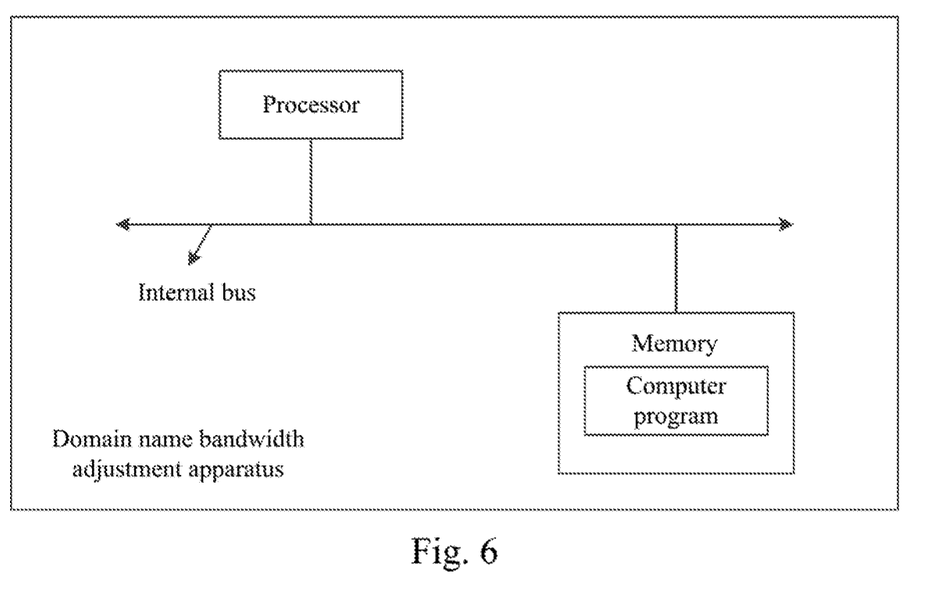
FIG. 6 is a schematic structural diagram of a domain name bandwidth adjustment apparatus according to an embodiment of the present disclosure.

Referring to FIG. 6, the present disclosure further provides a domain name bandwidth adjustment apparatus applied to a CDN system, the domain name bandwidth adjustment apparatus includes a memory and a processor, the memory is configured to store a computer program, and when the computer program is executed by the processor, the foregoing domain name bandwidth adjustment method is implemented. In particular, the domain name bandwidth adjustment apparatus may include hardware such as a processor, an internal bus, and a memory. The memory may include an internal storage and a non-volatile storage. The processor reads a corresponding computer program from the non-volatile storage into the memory and then runs the program. Those skilled in the art may understand that, the structure shown in FIG. 6 is merely an example and does not constitute a limitation on the structure of the foregoing identification apparatus. For example, the domain name bandwidth adjustment apparatus may further include more or less components than those shown in FIG. 6, or may further include other processing hardware such as a Graphics Processing Unit (GPU) or an external communication port such as a port 80, a port 443, or a port 8080. Certainly, in addition to a software embodiment, the present disclosure does not exclude other embodiments, such as a logic device or a combination of software and hardware.

In this embodiment, the processor may include a central processing unit (CPU) or a graphics processing unit (GPU), or may include other single-chip microcomputers, logic gate circuits, integrated circuits having a logic processing capability, or a proper combination thereof. The memory described in this embodiment may be a memory device for storing information. In a digital system, a device capable of storing binary data may be a memory. In an integrated circuit, a circuit having a storage function without a physical form, such as a RAM or an FIFO may also be a memory. In a system, a storage device having a physical form may also be referred to as a memory or the like. During embodiment, the memory may also be implemented using a cloud storage. A specific embodiment is not limited in the description.

It should be noted that, the domain name bandwidth adjustment apparatus in the description may be particularly implemented with reference to the descriptions of the method embodiment, and details are not described herein.

It can be learned that, according to the technical solutions provided in the present disclosure, the CDN system can automatically determine, according to load state of the edge node server or the relay node server, whether to trigger the bandwidth speed limiting policy, and automatically determines, when determining to trigger the bandwidth speed limiting policy, a target domain name that needs to be limited from domain names served by the edge node server or relay node server, and then limits an edge bandwidth or a back-source bandwidth of the target domain name according to the specified initial reference bandwidth. If a duration of time—in which the actual bandwidth of the target domain name is less than or equal to the initial reference bandwidth—reaches a preset reference duration, the CDN system performs step adjustment on the initial reference bandwidth of the target domain name, and gradually increases an available bandwidth of the target domain name in the entire CDN system according to an adjusted reference bandwidth, to improve user experience in accessing the target domain name. When the duration of time—in which the actual bandwidth of the target domain name is less than or equal to the initial reference bandwidth—reaches the specified observation duration, the CDN system releases the bandwidth speed limiting policy to completely release the bandwidth limit on the target domain name. It can be learned that, according to the technical solutions provided in the present disclosure, the CDN system can gradually recover acceleration on the target domain name by performing bandwidth step adjustment and limiting observation on the target domain name, not only improving the user experience in accessing the target domain name, but also preventing the edge bandwidth or the back-source bandwidth of the target domain name from rising again as a result of direct release of the bandwidth limit.

Through the descriptions of the preceding embodiments, those skilled in the art may understand that the embodiments may be implemented by using hardware only or by using software and a necessary universal hardware platform. Based on such understandings, the technical solution or the part that makes contributions to the existing art may be essentially embodied in the form of a software product. The software product may be stored in a computer readable storage medium, which can be a magnetic disk, a Compact Disk Read-Only Memory (CD-ROM), a Read-Only Memory (ROM) or a Random Access Memory (RAM). The software product includes a number of instructions that enable a computer device (a personal computer, a server, or a network device) to execute the methods provided in the embodiments.

The foregoing descriptions are merely exemplary embodiments of this application, but are not intended to limit this application. Any modifications, equivalent substitutions, and improvements made within the spirit and principle of this application shall fall within the protection scope of this application.

What is claimed is:

1. A domain name bandwidth adjustment method applied to a CDN system, wherein the method comprises:
   determining whether the CDN system triggers a bandwidth speed limiting policy, if yes, determining a to-be-limited target domain name from domain names served by the CDN system, and performing the bandwidth speed limiting policy on the target domain name; and
   when the bandwidth speed limiting policy is being executed, determining an initial reference bandwidth of the target domain name, and comparing the initial reference bandwidth with an actual bandwidth of the target domain name within a specified observation duration, to determine whether to perform step adjustment on the initial reference bandwidth and determine whether to release the bandwidth speed limiting policy.

2. The method according to claim 1, wherein the determining, for an edge node server in the CDN system, whether the CDN system triggers the bandwidth speed limiting policy comprises:
   calculating a performance indicator of the edge node server, when the performance indicator is lower than a preset indicator threshold, the bandwidth speed limiting policy being triggered.

3. The method according to claim 1, wherein the determining, for a relay node server in the CDN system, whether the CDN system triggers a bandwidth speed limiting policy comprises:
   determining whether the relay node server generates alarm information, if yes, the bandwidth speed limiting policy being triggered.

4. The method according to claim 1, wherein the determining whether to perform step adjustment on the initial reference bandwidth comprises:
   determining a proportion reference bandwidth according to the initial reference bandwidth and a preset proportion coefficient;
   recording a time node at which the actual bandwidth of the target domain name is less than or equal to the proportion reference bandwidth for the first time, and determining, from the recorded time node, whether a duration of time—in which the actual bandwidth of the target domain name is less than or equal to the proportion reference bandwidth—reaches a preset reference duration; and performing step adjustment on the initial reference bandwidth if the duration of time reaches the preset reference duration.

5. The method according to claim 4, wherein the determining whether to perform step adjustment on the initial reference bandwidth further comprises:

if the duration of time is less than the preset reference duration, re-recording, from a moment at which the actual bandwidth of the target domain name is greater than the proportion reference bandwidth, a time node at which the actual bandwidth of the target domain name is less than or equal to the proportion reference bandwidth for the first time, and determining, from the re-recorded time node, whether a duration of time—in which the actual bandwidth of the target domain name is less than or equal to the proportion reference bandwidth—reaches the preset reference duration.

6. The method according to claim 4, wherein the performing step adjustment on the initial reference bandwidth comprises:

determining an adjusted step reference bandwidth according to the initial reference bandwidth and a preset growth coefficient, and recording a time node at which the bandwidth is adjusted;

determining, from the time node at which the bandwidth is adjusted, whether a duration of time—in which the actual bandwidth of the target domain name is less than or equal to the proportion reference bandwidth—reaches the preset reference duration; and if the duration of time reaches the preset reference duration, determining a new step reference bandwidth according to the step reference bandwidth and the preset growth coefficient, and recording a time node at which the bandwidth is adjusted.

7. The method according to claim 6, wherein the performing step adjustment on the initial reference bandwidth further comprises:

if the duration of time—in which the actual bandwidth of the target domain name is less than or equal to the proportion reference bandwidth—is less than the preset reference duration, re-recording, from the moment at which the actual bandwidth of the target domain name is greater than the proportion reference bandwidth, a time node at which the actual bandwidth of the target domain name is less than or equal to the proportion reference bandwidth for the first time, and determining, from the re-recorded time node, whether a duration of time—in which the actual bandwidth of the target domain name is less than or equal to the proportion reference bandwidth—reaches the preset reference duration.

8. The method according to claim 1, wherein the determining whether to release the bandwidth speed limiting policy comprises:

determining whether a duration of time—in which the actual bandwidth of the target domain name is less than or equal to the initial reference bandwidth—reaches the specified observation duration; and releasing the bandwidth speed limiting policy if the duration of time reaches the specified observation duration; or if the duration of time is less than the specified observation duration, resetting a reference bandwidth after step adjustment is performed to the initial reference bandwidth, and comparing the initial reference bandwidth with the actual bandwidth of the target domain name again within the specified observation duration, to determine whether to perform step adjustment on the initial reference bandwidth and determine whether to release the bandwidth speed limiting policy.

9. The method according to claim 1, wherein for a target cache server serving the target domain name in the CDN system, the bandwidth speed limiting policy comprises:

determining a bandwidth limit value of the target domain name on each target cache server, and sending the bandwidth limit value to a corresponding target cache server.

10. The method according to claim 9, wherein the determining a bandwidth limit value of the target domain name on each target cache server comprises:

determining an initial bandwidth limit value of the target domain name on a current target cache server according to a preset bandwidth limit total value and a bandwidth proportion corresponding to the current target cache server; and after step adjustment is performed on the initial reference bandwidth, determining a step bandwidth limit value of the target domain name on the current target cache server according to an adjusted reference bandwidth and the bandwidth proportion corresponding to the current target cache server.

11. A domain name bandwidth adjustment apparatus, applied to a CDN system, wherein the domain name bandwidth adjustment apparatus comprises a memory and a processor, the memory being configured to store a computer program, and when the computer program is executed by the processor, cause the processor to perform a method comprising:

determining whether the CDN system triggers a bandwidth speed limiting policy, if yes, determining a to-be-limited target domain name from domain names served by the CDN system, and performing the bandwidth speed limiting policy on the target domain name; and when the bandwidth speed limiting policy is being executed, determining an initial reference bandwidth of the target domain name, and comparing the initial reference bandwidth with an actual bandwidth of the target domain name within a specified observation duration, to determine whether to perform step adjustment on the initial reference bandwidth and determine whether to release the bandwidth speed limiting policy.

12. The apparatus according to claim 11, wherein the determining, for an edge node server in the CDN system, whether the CDN system triggers the bandwidth speed limiting policy in the method performed by the processor comprises:

calculating a performance indicator of the edge node server, when the performance indicator is lower than a preset indicator threshold, the bandwidth speed limiting policy being triggered.

13. The apparatus according to claim 11, wherein the determining, for a relay node server in the CDN system, whether the CDN system triggers a bandwidth speed limiting policy in the method performed by the processor comprises:

determining whether the relay node server generates alarm information, if yes, the bandwidth speed limiting policy being triggered.

14. The apparatus according to claim 11, wherein the determining whether to perform step adjustment on the initial reference bandwidth in the method performed by the processor comprises:
- determining a proportion reference bandwidth according to the initial reference bandwidth and a preset proportion coefficient;
- recording a time node at which the actual bandwidth of the target domain name is less than or equal to the proportion reference bandwidth for the first time, and determining, from the recorded time node, whether a duration of time—in which the actual bandwidth of the target domain name is less than or equal to the proportion reference bandwidth—reaches a preset reference duration; and
- performing step adjustment on the initial reference bandwidth if the duration of time reaches the preset reference duration.

15. The apparatus according to claim 14, wherein the determining whether to perform step adjustment on the initial reference bandwidth in the method performed by the processor further comprises:
- if the duration of time is less than the preset reference duration, re-recording, from a moment at which the actual bandwidth of the target domain name is greater than the proportion reference bandwidth, a time node at which the actual bandwidth of the target domain name is less than or equal to the proportion reference bandwidth for the first time, and determining, from the re-recorded time node, whether a duration of time—in which the actual bandwidth of the target domain name is less than or equal to the proportion reference bandwidth—reaches the preset reference duration.

16. The apparatus according to claim 14, wherein the performing step adjustment on the initial reference bandwidth in the method performed by the processor comprises:
- determining an adjusted step reference bandwidth according to the initial reference bandwidth and a preset growth coefficient, and recording a time node at which the bandwidth is adjusted;
- determining, from the time node at which the bandwidth is adjusted, whether a duration of time—in which the actual bandwidth of the target domain name is less than or equal to the proportion reference bandwidth—reaches the preset reference duration; and
- if the duration of time reaches the preset reference duration, determining a new step reference bandwidth according to the step reference bandwidth and the preset growth coefficient, and recording a time node at which the bandwidth is adjusted.

17. The apparatus according to claim 16, wherein the performing step adjustment on the initial reference bandwidth in the method performed by the processor further comprises:
- if the duration of time—in which the actual bandwidth of the target domain name is less than or equal to the proportion reference bandwidth—is less than the preset reference duration, re-recording, from the moment at which the actual bandwidth of the target domain name is greater than the proportion reference bandwidth, a time node at which the actual bandwidth of the target domain name is less than or equal to the proportion reference bandwidth for the first time, and determining, from the re-recorded time node, whether a duration of time—in which the actual bandwidth of the target domain name is less than or equal to the proportion reference bandwidth—reaches the preset reference duration.

18. The apparatus according to claim 11, wherein the determining whether to release the bandwidth speed limiting policy in the method performed by the processor comprises:
- determining whether a duration of time—in which the actual bandwidth of the target domain name is less than or equal to the initial reference bandwidth—reaches the specified observation duration; and
- releasing the bandwidth speed limiting policy if the duration of time reaches the specified observation duration; or
- if the duration of time is less than the specified observation duration, resetting a reference bandwidth after step adjustment is performed to the initial reference bandwidth, and comparing the initial reference bandwidth with the actual bandwidth of the target domain name again within the specified observation duration, to determine whether to perform step adjustment on the initial reference bandwidth and determine whether to release the bandwidth speed limiting policy.

19. The apparatus according to claim 11, wherein for a target cache server serving the target domain name in the CDN system, the bandwidth speed limiting policy in the method performed by the processor comprises:
- determining a bandwidth limit value of the target domain name on each target cache server, and sending the bandwidth limit value to a corresponding target cache server.

20. The apparatus according to claim 19, wherein the determining a bandwidth limit value of the target domain name on each target cache server in the method performed by the processor comprises:
- determining an initial bandwidth limit value of the target domain name on a current target cache server according to a preset bandwidth limit total value and a bandwidth proportion corresponding to the current target cache server; and
- after step adjustment is performed on the initial reference bandwidth, determining a step bandwidth limit value of the target domain name on the current target cache server according to an adjusted reference bandwidth and the bandwidth proportion corresponding to the current target cache server.

* * * * *